(12) United States Patent
Zhang et al.

(10) Patent No.: US 12,392,924 B2
(45) Date of Patent: Aug. 19, 2025

(54) EXPERIMENTAL DEVICE AND METHOD FOR SIMULATING SUBSURFACE EROSION PROCESS

(71) Applicant: Qingdao University of Technology, Qingdao (CN)

(72) Inventors: Jin Zhang, Qingdao (CN); Chuanhao Xi, Qingdao (CN); Huazhong Qi, Qingdao (CN); Zihan Ma, Qingdao (CN); Chuanlong Xu, Qingdao (CN); Mengxue Wang, Qingdao (CN)

(73) Assignee: QINGDAO UNIVERSITY OF TECHNOLOGY, Qingdao (CN)

( * ) Notice: Subject to any disclaimer, the term of this patent is extended or adjusted under 35 U.S.C. 154(b) by 280 days.

(21) Appl. No.: 18/230,831

(22) Filed: Aug. 7, 2023

(65) Prior Publication Data

US 2024/0142663 A1    May 2, 2024

(30) Foreign Application Priority Data

Nov. 1, 2022 (CN) .......................... 202211356820.5

(51) Int. Cl.
*G01V 20/00* (2024.01)

(52) U.S. Cl.
CPC .................................. *G01V 20/00* (2024.01)

(58) Field of Classification Search
CPC ...... G01V 20/00; G01V 2210/66; G01V 1/50; G01V 3/38; G01V 2210/645; G01V 1/00; G01V 2210/1429; E21B 43/26; G01N 33/24
See application file for complete search history.

(56) References Cited

FOREIGN PATENT DOCUMENTS

| CN | 208938479 | * | 6/2019 |
| CN | 110221044 | * | 9/2019 |

* cited by examiner

*Primary Examiner* — Tarun Sinha
(74) *Attorney, Agent, or Firm* — Timothy W. Menasco, Esq.; Harter Secrest & Emery LLP

(57) ABSTRACT

An experimental device and method for simulating a subsurface erosion process is disclosed, including a constant-pressure water supply device, a subsurface erosion generator, and a water-soil collection device. The constant-pressure water supply device and the subsurface erosion generator communicate with each other by a pipeline. The constant-pressure water supply device is used to simulate a natural water flow in subsurface erosion. The subsurface erosion generator is used to carry sand and display the occurrence process of water-soil subsurface erosion. The water-soil collection device is used to collect soil and water loss data required for an experiment. In accordance with the experimental device, the water-soil subsurface erosion process can be accurately displayed, a water pressure can be adjusted as needed, and a height between the constant-pressure water supply device and the erosion generator can be adjusted to simulate the terrain.

8 Claims, 5 Drawing Sheets

EXPERIMENTAL DEVICE AND METHOD FOR SIMULATING SUBSURFACE EROSION PROCESS

CROSS-REFERENCE TO RELATED APPLICATION

This patent application claims the benefit and priority of Chinese Patent Application No. 202211356820.5 filed with the China National Intellectual Property Administration on Nov. 1, 2022, the disclosure of which is incorporated by reference herein in its entirety as part of the present application.

TECHNICAL FIELD

The present disclosure relates to the technical field of experimental devices for construction engineering, and in particular relates to an experimental device and method for simulating a subsurface erosion process.

BACKGROUND

In recent years, the rock and soil mass of projects under construction or existing projects in many regions has been destroyed due to the erosion of groundwater, and the main form of destruction is subsurface erosion. Subsurface erosion refers to the selective erosion of fine particles in coarse bone particles under the action of penetrating water. Groundwater is usually deeply buried underground, so the destruction phenomenon of the subsurface erosion caused by the deeply-buried groundwater has strong concealment and hysteresis spreading to the surface. At present, research methods related to the destruction of subsurface erosion caused by groundwater are mostly based on field investigation, and few of which are quantitatively analyzed through laboratory physical model tests. In order to overcome deficiencies in the prior art, a device and method capable of visually simulating the particle loss amount of rock and soil mass, the erosion rate of the rock and soil mass and the permeability coefficient of the rock and soil mass under different hydraulic gradients and different soil mass types are provided, which clarify the destructive process and form of subsurface erosion caused by groundwater.

SUMMARY

An objective of the present disclosure is to provide an experimental device and method for simulating a subsurface erosion process, so as to solve the problems in the background art.

To achieve the objective, the present disclosure provides the following technical solution: an experimental device for simulating a subsurface erosion process includes a constant-pressure water supply device, a subsurface erosion generator, and a water-soil collection device. The constant-pressure water supply device and the subsurface erosion generator communicate with each other by a pipeline.

The constant-pressure water supply device is used to simulate a natural water flow in the subsurface erosion.

The subsurface erosion generator is used to carry sand and display an occurrence process of water-soil subsurface erosion.

The water-soil collection device is used to collect soil and water loss data required for an experiment.

The constant-pressure water supply device includes a water tank. A top of the water tank is provided with a water inlet end, a bottom of the water tank is provided with a water outlet end, and the water outlet end of the water tank is connected to the subsurface erosion generator by a pipeline.

The subsurface erosion generator includes a model box for soil loading and a water inlet pressure measuring box which are in communication with each other. The model box for soil loading is located above the water inlet pressure measuring box.

The model box for soil loading and the water inlet pressure measuring box are separated by a perforated partition plate, and an upper end of the perforated partition plate is covered with a gauze mesh.

A bottom of the water inlet pressure measuring box is provided with a water inlet end, and the water inlet end of the water inlet pressure measuring box communicates with the water outlet end of the water tank by a pipeline.

A side wall of the model box for soil loading is provided with a water outlet end, and the water outlet end of the model box for soil loading extends into the water-soil collection device by a pipeline.

A beaker is used as the water-soil collection device.

A pressure gauge is connected to a side wall of the water inlet pressure measuring box by an elbow joint.

Preferably, a tripod for carrying the constant-pressure water supply device is installed at the bottom of the water tank, and a liftable tripod is used as the tripod.

Preferably, the water inlet end of the water tank is a communication structure composed of a first external thread metal joint, a first valve and a first hose connected in sequence. The water outlet end of the water tank is a communication structure composed of a second external thread metal joint and a second valve.

The water inlet end of the water inlet pressure measuring box is a communication structure composed of a third external thread metal joint and a third valve.

The water outlet end of the model box for soil loading is a communication structure composed of a fourth external thread metal joint, a fourth valve and a third hose connected in sequence.

The second valve communicates with the third valve by a second hose.

Preferably, the bottom of the water inlet pressure measuring box is provided with a base for carrying the subsurface erosion generator.

An upper end part of the base is provided with an external thread metal joint penetrating hole.

Preferably, a sealing plate is arranged at the top of the model box for soil loading, a piping port is formed in the sealing plate, and a fifth external thread metal joint is installed in the piping port by screwing.

Preferably, a rubber plug is inserted into an upper end part of the fifth external thread metal joint.

A method of using an experimental device for simulating a subsurface erosion process includes the following steps:

S1: selecting an appropriate perforated partition plate and placing it into a subsurface erosion generator, and placing two layers of fine gauze with mesh size suitable for an experiment on the perforated partition plate;

S2: loading a soil sample into the subsurface erosion generator, tamping the soil sample in layers to a required height during loading, and roughening a surface of the soil sample after tamping each layer of the soil sample, thus enabling the soil sample to become a whole;

S3: adjusting a height of a tripod to a design value, measuring a distance h from a bottom of a water outlet of the subsurface erosion generator to the ground with a tape measure, and measuring a distance H from a stable water surface of a constant-pressure water supply device to the ground;

Designing a Hydraulic Head as Follows: $\Delta h = H - h$;

S4: opening a first valve, and injecting water into a water tank until the surface of the water in the water tank reaches a water level line;

S5: opening a second valve, and then opening a third valve, closing the third valve when the water enters a water inlet pressure measuring box along a second hose, and observing whether any one of components of the device is in water leakage;

S6: opening the third valve, and closing the third valve when a stainless-steel elbow joint is flooded by water, obtaining a reading of a pressure gauge, observing whether the actual hydraulic head reaches a design value of the hydraulic head; and if the actual hydraulic head does not reach the design value of the hydraulic head, adjusting the height of the tripod until the design value of the hydraulic head is reached;

S7: continuously opening the third valve, closing the third valve when the water reaches threads of a top plate of the water inlet pressure measuring box, and then installing a model box for soil loading;

S8: opening the third valve to observe a phenomenon of subsurface erosion generated in the subsurface erosion generator;

S9: measuring a flow within a certain period of time by a beaker, and converting it to a flow velocity; and S10: standing the exudate of water and soil collected in the beaker for 24 hours, then pouring out clarified liquid within the upper levels of the exudate in the beaker, drying the remaining mud in the beaker, measuring the mass of the remaining mud after drying, and converting it to the amount of drift sand.

Compared with the prior art, the present disclosure has the beneficial effects that: the water-soil subsurface erosion process can be accurately displayed, a water pressure can be adjusted as needed, and a height between the constant-pressure water supply device and the subsurface erosion generator can be adjusted to simulate the terrain. Separate control can be better achieved by each valve, so as to simulate experimental conditions in different variable states, and all the required data such as flow, flow velocity and water-soil erosion can be intuitively displayed.

Figure 1:
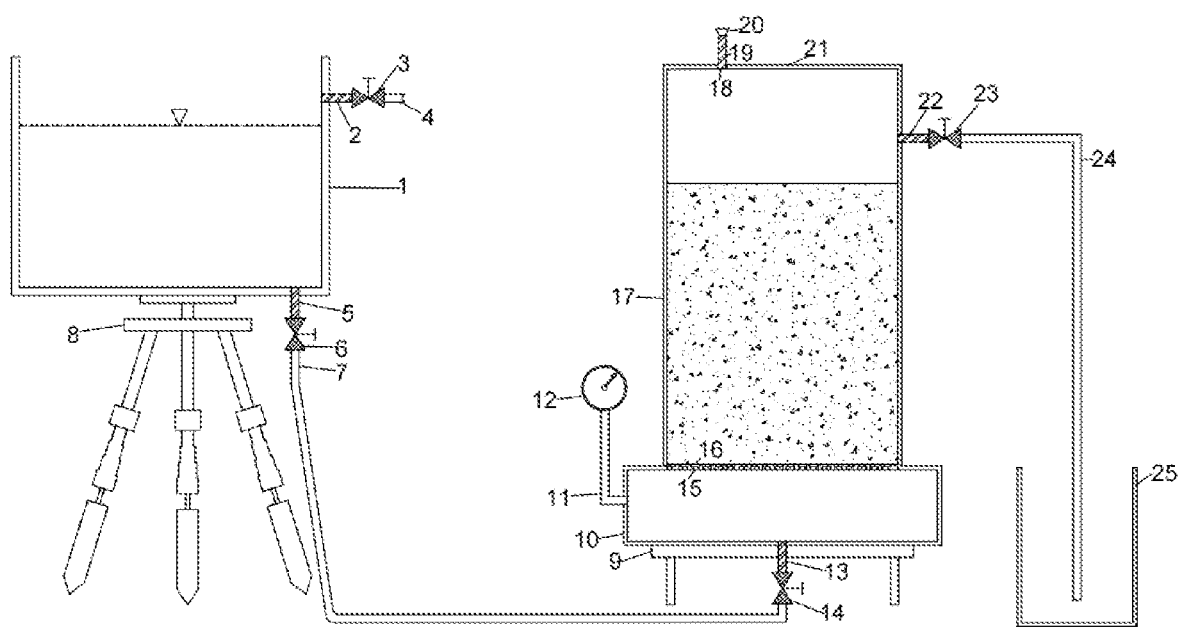
FIG. 1 is a structural schematic diagram of an experimental device in accordance with the present disclosure.

In the drawings: 1 water tank; 2 first external thread metal joint; 3 first valve; 4 first hose; 5 second external thread metal joint; 6 second valve; 7 second hose; 8 tripod; 9 base; 10 water inlet pressure measuring box; 11 stainless-steel elbow joint; 12 pressure gauge; 13 third external thread metal joint; 14 third valve; 15 perforated partition plate; 16 gauze mesh; 17 model box for soil loading; 18 piping port; 19 fifth external thread metal joint; 20 rubber plug; 21 sealing plate; 22 fourth external thread metal joint; 23 fourth valve; 24 third hose; 25 beaker.

DETAILED DESCRIPTION OF THE EMBODIMENTS

The following clearly and completely describes the technical solutions in the embodiments of the present disclosure with reference to the accompanying drawings in the embodiments of the present disclosure. Apparently, the described embodiments are merely a part rather than all of the embodiments of the present disclosure. All other embodiments obtained by a person of ordinary skill in the art based on the embodiments of the present disclosure without creative efforts shall fall within the protection scope of the present disclosure.

Figure 2:
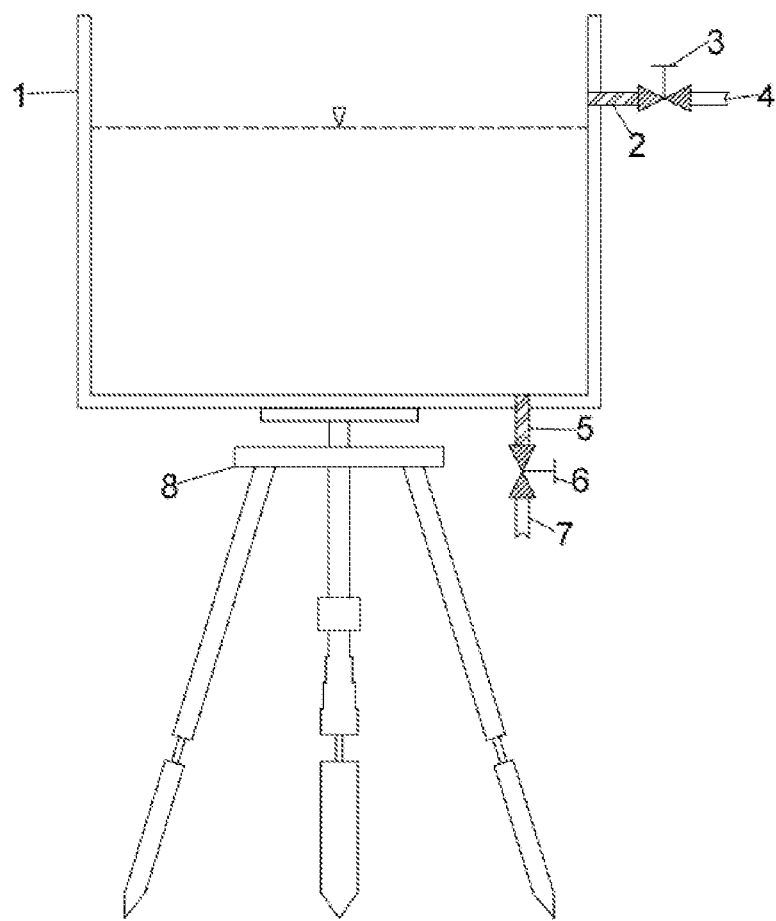
FIG. 2 is a structural schematic diagram of a constant-pressure water supply device in accordance with the present disclosure.
Figure 3:
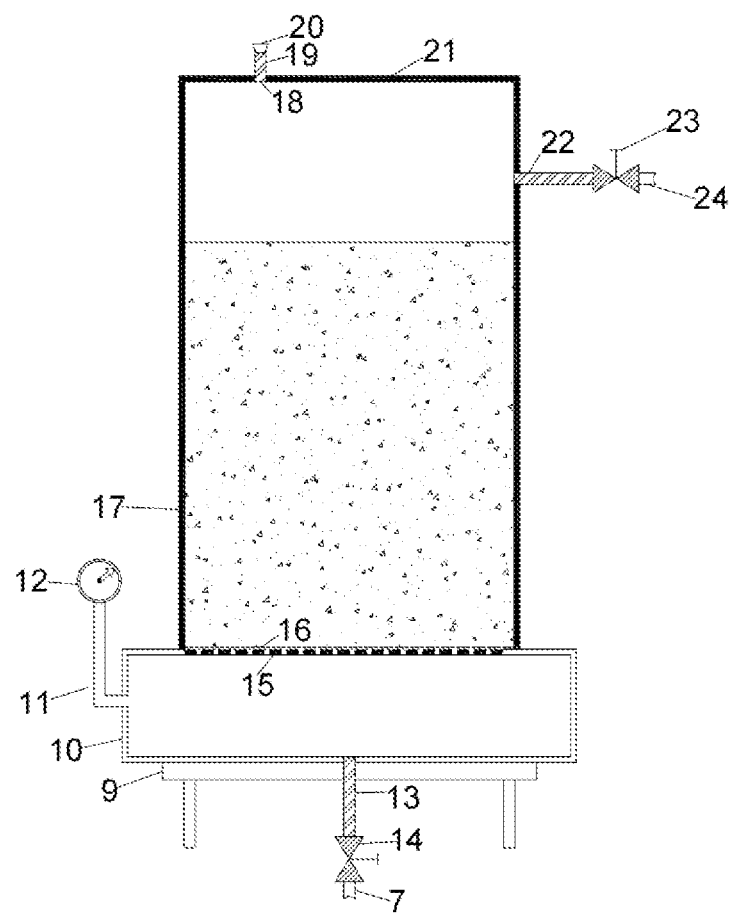
FIG. 3 is a structural schematic diagram of a subsurface erosion generator in accordance with the present disclosure.
Figure 4:
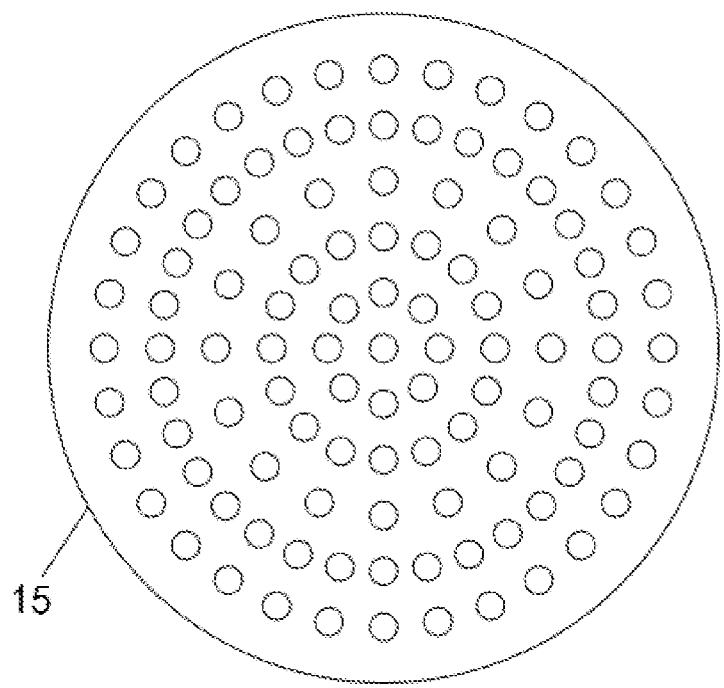
FIG. 4 is a top view of a perforated partition plate in accordance with the present disclosure.
Figure 5:
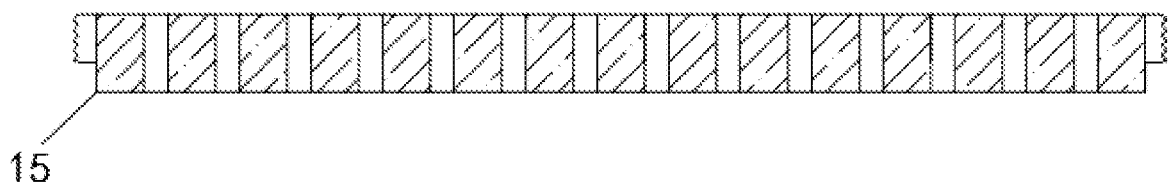
FIG. 5 is a front view of a perforated partition plate in accordance with the present disclosure.
Figure 6:
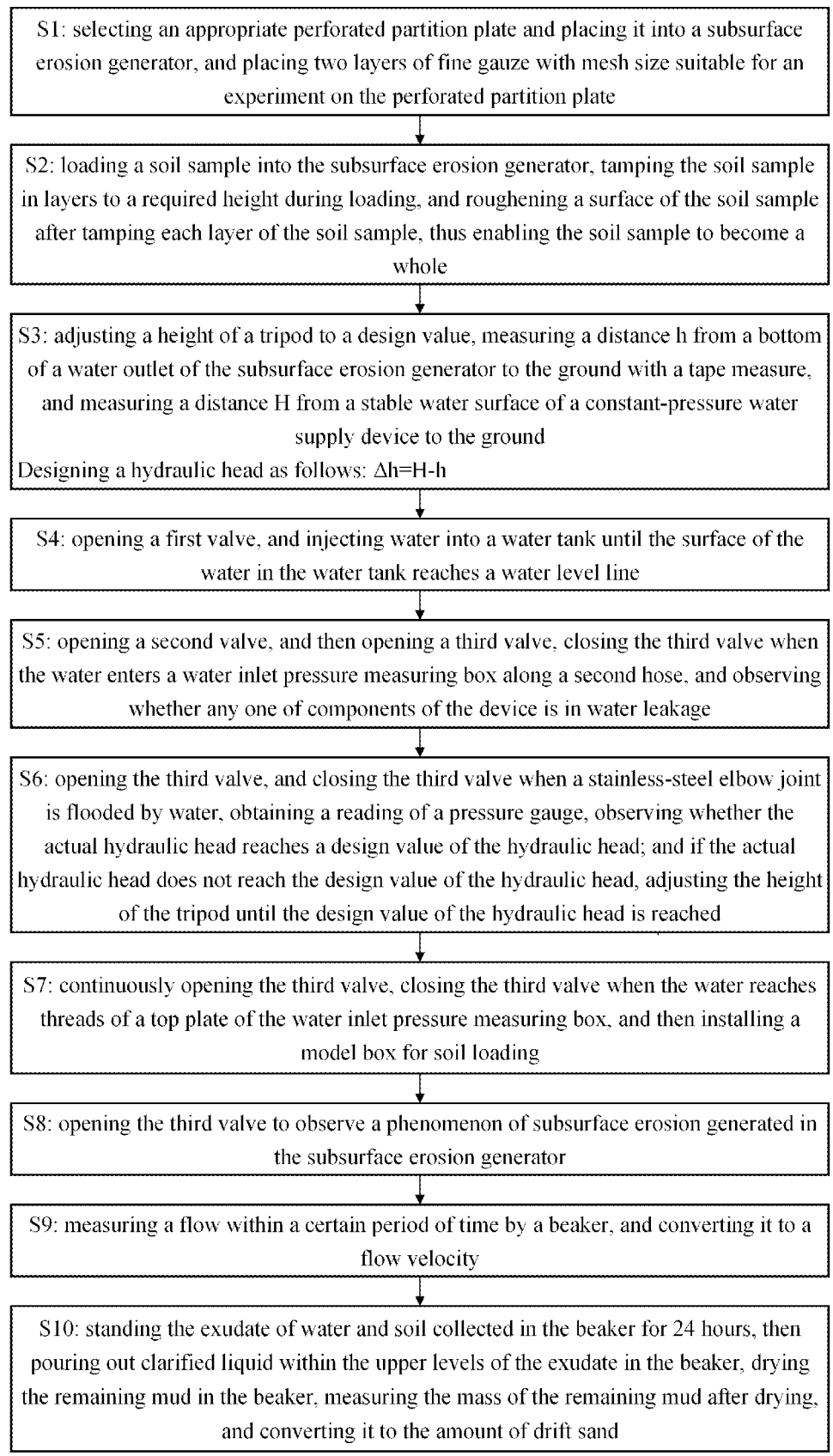
FIG. 6 is a schematic flowchart of a method for simulating a subsurface erosion process in accordance with the present disclosure.

Referring to FIG. 1 to FIG. 5, the present disclosure provides the following technical solution: an experimental device for simulating a subsurface erosion process includes a constant-pressure water supply device, a subsurface erosion generator, and a water-soil collection device. The constant-pressure water supply device and the subsurface erosion generator communicate with each other by a pipeline.

The constant-pressure water supply device is used to simulate a natural water flow in subsurface erosion.

The subsurface erosion generator is used to carry sand and display the occurrence process of water-soil subsurface erosion.

The water-soil collection device is used to collect soil and water loss data required for by an experiment.

The constant-pressure water supply device includes a water tank 1. A top of the water tank 1 is provided with a water inlet end, a bottom of the water tank 1 is provided with a water outlet end, and the water outlet end of the water tank 1 is connected to the subsurface erosion generator by a pipeline.

The subsurface erosion generator includes a model box for soil loading 17 and a water inlet pressure measuring box 10 which are in communication with each other. The model box for soil loading 17 is located above the water inlet pressure measuring box 10.

The model box for soil loading 17 and the water inlet pressure measuring box 10 are separated by a perforated partition plate 15, and through holes are vertically and uniformly formed in the perforated partition plate 15, which allow water flow through while preventing sand from sinking. An upper end of the perforated partition plate 15 is covered with a gauze mesh 16, and the provided gauze mesh 16 can further prevent sand from sinking.

A bottom of the water inlet pressure measuring box 10 is provided with a water inlet end, and the water inlet end of the water inlet pressure measuring box 10 communicates with the water outlet end of the water tank 1 by a pipeline.

A side wall of the model box for soil loading 17 is provided with a water outlet end, and the water outlet end of the model box for soil loading 17 extends into the water-soil collection device by a pipeline.

A pressure gauge 12 is connected to a side wall of the water inlet pressure measuring box 10 by an elbow joint 11.

A beaker 25 is used as the water-soil collection device. The actual size of the beaker 25 can be selected as required, and the beaker 25 can be directly used for drying or heating, so as to reduce experimental errors.

Preferably, a tripod 8 for carrying the constant-pressure water supply device is installed at the bottom of the water tank 1, and a liftable tripod is used as the tripod 8.

The water inlet end of the water tank 1 is a communication structure composed of a first external thread metal joint 2, a first valve 3 and a first hose 4 connected in sequence.

The water outlet end of the water tank 1 is a communication structure composed of a second external thread metal joint 5 and a second valve 6.

The water inlet end of the water inlet pressure measuring box 10 is a communication structure composed of a third external thread metal joint 13 and a third valve 14.

The water outlet end of the model box for soil loading 17 is a communication structure composed of a fourth external thread metal joint 22, a fourth valve 23 and a third hose 24 connected in sequence.

The external thread metal joint in the communication structure is used for connecting the constant-pressure water supply device or the subsurface erosion generator, so as to achieve the transmission of the water flow.

The second valve 6 communicates with the third valve 14 by a second hose 7.

The bottom of the water inlet pressure measuring box 10 is provided with a base 9 for carrying the subsurface erosion generator.

An upper end part of the base 9 is provided with an external thread metal joint penetrating hole.

The external thread metal joints in the device are all of the same specification.

A sealing plate 21 is arranged at the top of the model box for soil loading 17, a piping port 18 is formed in the sealing plate 21, and a fifth external thread metal joint 19 is installed in the piping port 18 by screwing.

A rubber plug 20 is inserted into an upper end part of the fifth external thread metal joint 19.

The piping port 18 can be opened or closed by the rubber plug 20.

The external thread metal joints in the device are all made of stainless steel, so as to reduce the occurrence of rustiness.

The water inlet pressure measuring box 10, the model box for soil loading 17 and the sealing plate are all made of transparent acrylic plates, which can display the experimental process more intuitively.

A method of using an experimental device for simulating a subsurface erosion process includes the following steps.

S1: selecting an appropriate perforated partition plate 15 and placing it into a subsurface erosion generator, and placing two layers of fine gauze with mesh size suitable for an experiment on the perforated partition plate 15;

S2: loading a soil sample into the subsurface erosion generator, tamping the soil sample in layers to a required height during loading, and roughening a surface of the soil sample after tamping each layer of the soil sample, thus enabling the soil sample to become a whole;

S3: adjusting a height of a tripod to a design value, measuring a distance h from a bottom of a water outlet of the subsurface erosion generator to the ground with a tape measure, and measuring a distance H from a stable water surface of a constant-pressure water supply device to the ground, it should be noted that the measured stable water surface of the constant-pressure water supply device is higher than the water outlet end of the subsurface erosion generator;

Designing a Hydraulic Head as Follows: Δh=H-h;

S4: opening a first valve 3, and injecting water into a water tank 1 until the surface of the water in the water tank 1 reaches a water level line;

S5: opening a second valve 6, and then opening a third valve 14, closing the third valve 14 when the water enters a water inlet pressure measuring box 10 along a second hose 7, and observing whether any one of components of the device is in water leakage;

S6: opening the third valve 14, and closing the third valve 14 when a stainless-steel elbow joint 16 is flooded by water, obtaining a reading of a pressure gauge 12, observing whether the actual hydraulic head reaches a design value of the hydraulic head, and if the actual hydraulic head does not reach the design value of the hydraulic head, adjusting the height of the tripod 8 until the design value of the hydraulic head is reached;

S7: continuously opening the third valve 14, closing the third valve 14 when the water reaches threads of a top plate of the water inlet pressure measuring box 10, and then installing a model box for soil loading 17;

S8: opening the third valve 14 to observe a phenomenon of subsurface erosion generated in the subsurface erosion generator;

S9: measuring a flow within a certain period of time by a beaker, and converting it to a flow velocity; and S10: standing the exudate of water and soil collected in the beaker 25 for 24 hours, then pouring out clarified liquid within upper levels of the exudate in the beaker, drying the remaining mud in the beaker 25, measuring the mass of the remaining mud after drying, and converting it to the amount of drift sand.

In accordance with the present disclosure, the water-soil subsurface erosion process can be accurately displayed, a water pressure can be adjusted as needed, and a height between the constant-pressure water supply device and the subsurface erosion generator can be adjusted to simulate the terrain. Separate control can be better achieved by each valve, so as to simulate experimental conditions in different variable states, and all the required data such as flow, flow velocity and water-soil erosion status can be intuitively displayed.

Although embodiments of the present disclosure have been shown and described, it should be understood to those of ordinary skill in the art that various variations, modifications, substitutions and modifications may be made to these embodiments without departing from the principle and spirit of the present disclosure, and the scope of the present disclosure is defined by the appended claims and their equivalents.

What is claimed is:

1. An experimental device for simulating a subsurface erosion process, comprising a constant-pressure water supply device, a subsurface erosion generator, and a water-soil collection device, wherein the constant-pressure water supply device and the subsurface erosion generator communicate with each other by a pipeline;

the constant-pressure water supply device is used to simulate a natural water flow in the subsurface erosion;

the subsurface erosion generator is used to carry sand and display the occurrence process of water-soil subsurface erosion; and the water-soil collection device is used to collect soil and water loss data required for an experiment;

characterized in that:

the constant-pressure water supply device comprises a water tank, a top of the water tank is provided with a water inlet end, a bottom of the water tank is provided with a water outlet end, and the water outlet end of the water tank is connected to the subsurface erosion generator by a pipeline;

the subsurface erosion generator comprises a model box for soil loading and a water inlet pressure measuring box which are in communication with each other, and the model box for soil loading is located above the water inlet pressure measuring box;

the model box for soil loading and the water inlet pressure measuring box are separated by a perforated partition plate, and an upper end of the perforated partition plate is covered with a gauze mesh;

a bottom of the water inlet pressure measuring box is provided with a water inlet end, and the water inlet end of the water inlet pressure measuring box communicates with the water outlet end of the water tank by a pipeline;

a side wall of the model box for soil loading is provided with a water outlet end, and the water outlet end of the model box for soil loading extends into the water-soil collection device by a pipeline; and a pressure gauge is connected to a side wall of the water inlet pressure measuring box by an elbow joint.

2. The experimental device for simulating a subsurface erosion process according to claim 1, characterized in that: a tripod for carrying the constant-pressure water supply device is installed at the bottom of the water tank, and a liftable tripod is used as the tripod.

3. The experimental device for simulating a subsurface erosion process according to claim 1, characterized in that: the water inlet end of the water tank is a communication structure composed of a first external thread metal joint, a first valve and a first hose connected in sequence;

the water outlet end of the water tank is a communication structure composed of a second external thread metal joint and a second valve;

the water inlet end of the water inlet pressure measuring box is a communication structure composed of a third external thread metal joint and a third valve;

the water outlet end of the model box for soil loading is a communication structure composed of a fourth external thread metal joint, a fourth valve, and a third hose connected in sequence; and the second valve communicates with the third valve by a second hose.

4. The experimental device for simulating a subsurface erosion process according to claim 1, characterized in that: the bottom of the water inlet pressure measuring box is provided with a base for carrying the subsurface erosion generator;

an upper end part of the base is provided with an external thread metal joint penetrating hole.

5. The experimental device for simulating a subsurface erosion process according to claim 1, characterized in that: a sealing plate is arranged at a top of the model box for soil loading, a piping port is formed in the sealing plate, and a fifth external thread metal joint is installed in the piping port by screwing.

6. The experimental device for simulating a subsurface erosion process according to claim 5, characterized in that: a rubber plug is inserted into an upper end part of the fifth external thread metal joint.

7. The experimental device for simulating a subsurface erosion process according to claim 1, characterized in that: a beaker is used as the water-soil collection device.

8. A method of using an experimental device for simulating a subsurface erosion process, comprising the following steps:

S1: selecting an appropriate perforated partition plate and placing it into a subsurface erosion generator, and placing two layers of fine gauze with mesh size suitable for an experiment on the perforated partition plate;

S2: loading a soil sample into the subsurface erosion generator, tamping the soil sample in layers to a required height during loading, and roughening a surface of the soil sample after tamping each layer of the soil sample, thus enabling the soil sample to become a whole;

S3: adjusting a height of a tripod to a design value, measuring a distance h from a bottom of a water outlet of the subsurface erosion generator to the ground with a tape measure, and measuring a distance H from a stable water surface of a constant-pressure water supply device to the ground;

designing a hydraulic head as follows: $\Delta h = H - h$;

S4: opening a first valve, and injecting water into a water tank until the surface of the water in the water tank reaches a water level line;

S5: opening a second valve, and then opening a third valve, closing the third valve when the water enters a water inlet pressure measuring box along a second hose, and observing whether any one of components of the device is in water leakage;

S6: opening the third valve, and closing the third valve when a stainless-steel elbow joint is flooded by water, obtaining a reading of a pressure gauge, observing whether the actual hydraulic head reaches a design value of the hydraulic head; and if the actual hydraulic head does not reach the design value of the hydraulic head, adjusting the height of the tripod until the design value of the hydraulic head is reached;

S7: continuously opening the third valve, closing the third valve when the water reaches threads of a top plate of the water inlet pressure measuring box, and then installing a model box for soil loading;

S8: opening the third valve to observe a phenomenon of subsurface erosion generated in the subsurface erosion generator;

S9: measuring a flow within a certain period of time by a beaker, and converting the flow to a flow velocity; and S10: standing the exudate of water and soil collected in the beaker for 24 hours, and then pouring out clarified liquid within upper levels of the exudate in the beaker, drying the remaining mud in the beaker, measuring the mass of the remaining mud after drying, and converting the mass of the remaining mud the amount of drift sand.

* * * * *